Nov. 14, 1961     C. E. McCORMICK     3,008,758
GLARE SHIELD FOR CURVED WINDSHIELDS
Filed Nov. 14, 1958     4 Sheets–Sheet 1
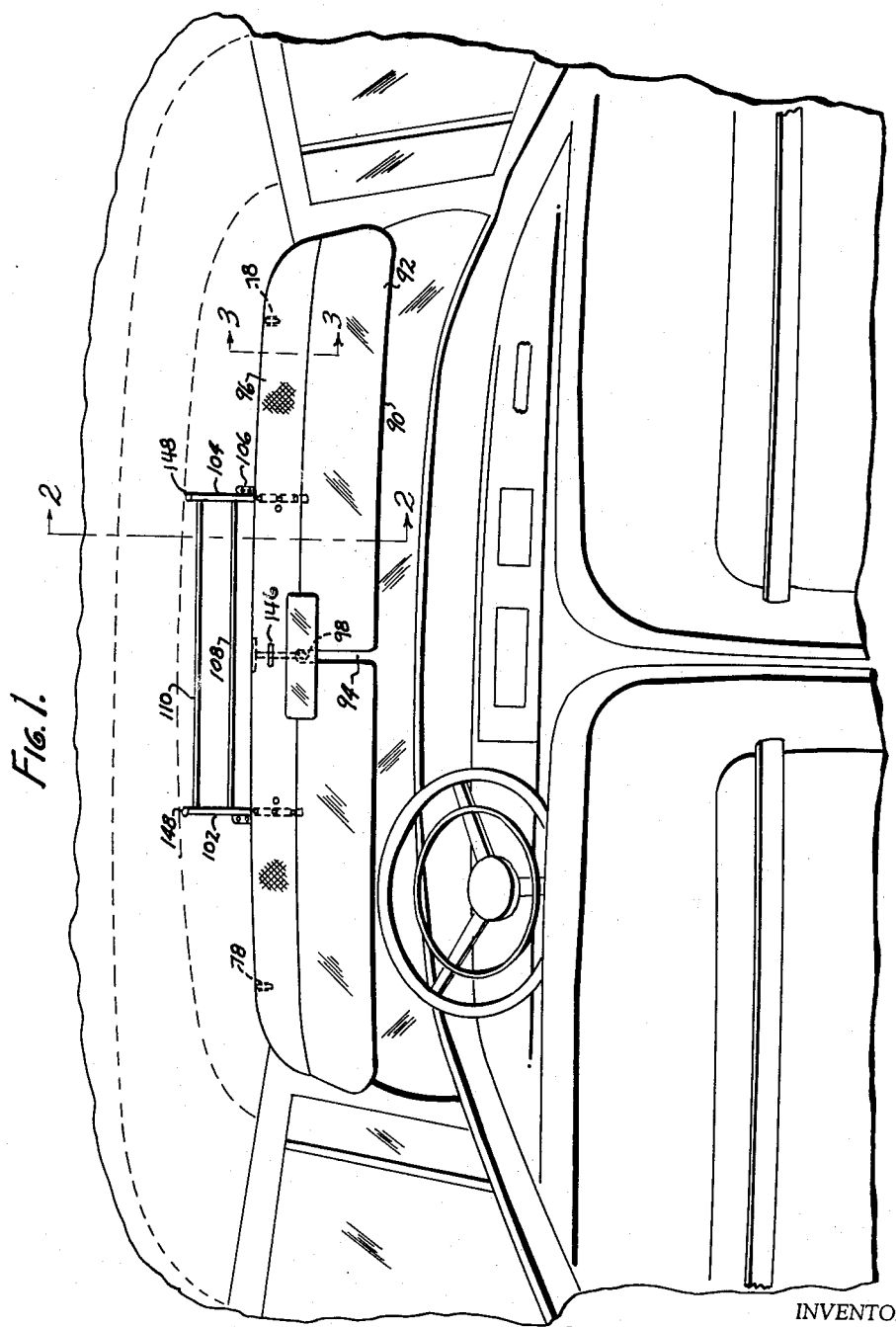
INVENTOR.
CHARLES E. McCORMICK
BY
Barnes, Kisselle, Raisch & Choate

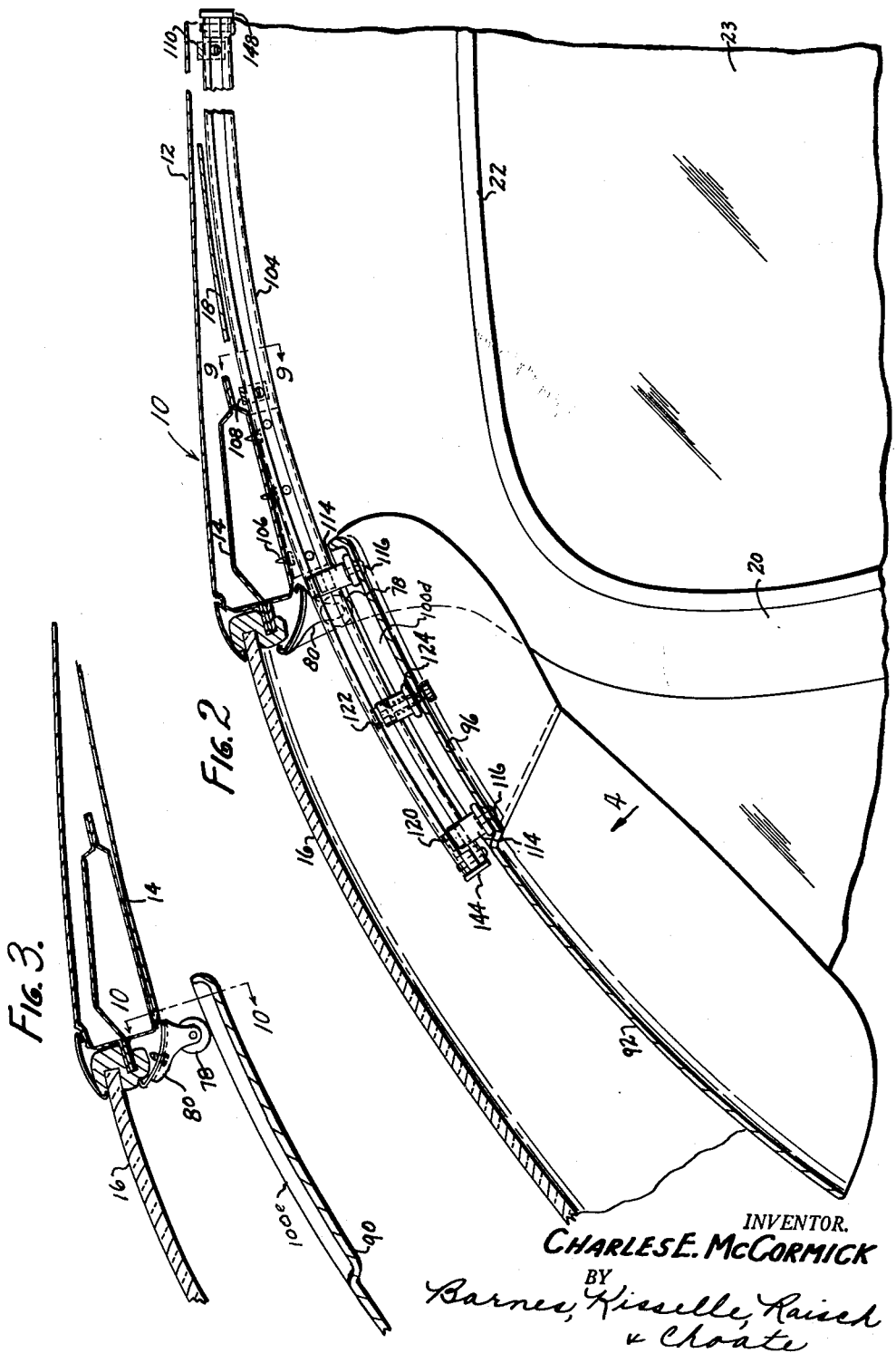

Nov. 14, 1961  C. E. McCORMICK  3,008,758
GLARE SHIELD FOR CURVED WINDSHIELDS
Filed Nov. 14, 1958  4 Sheets-Sheet 3
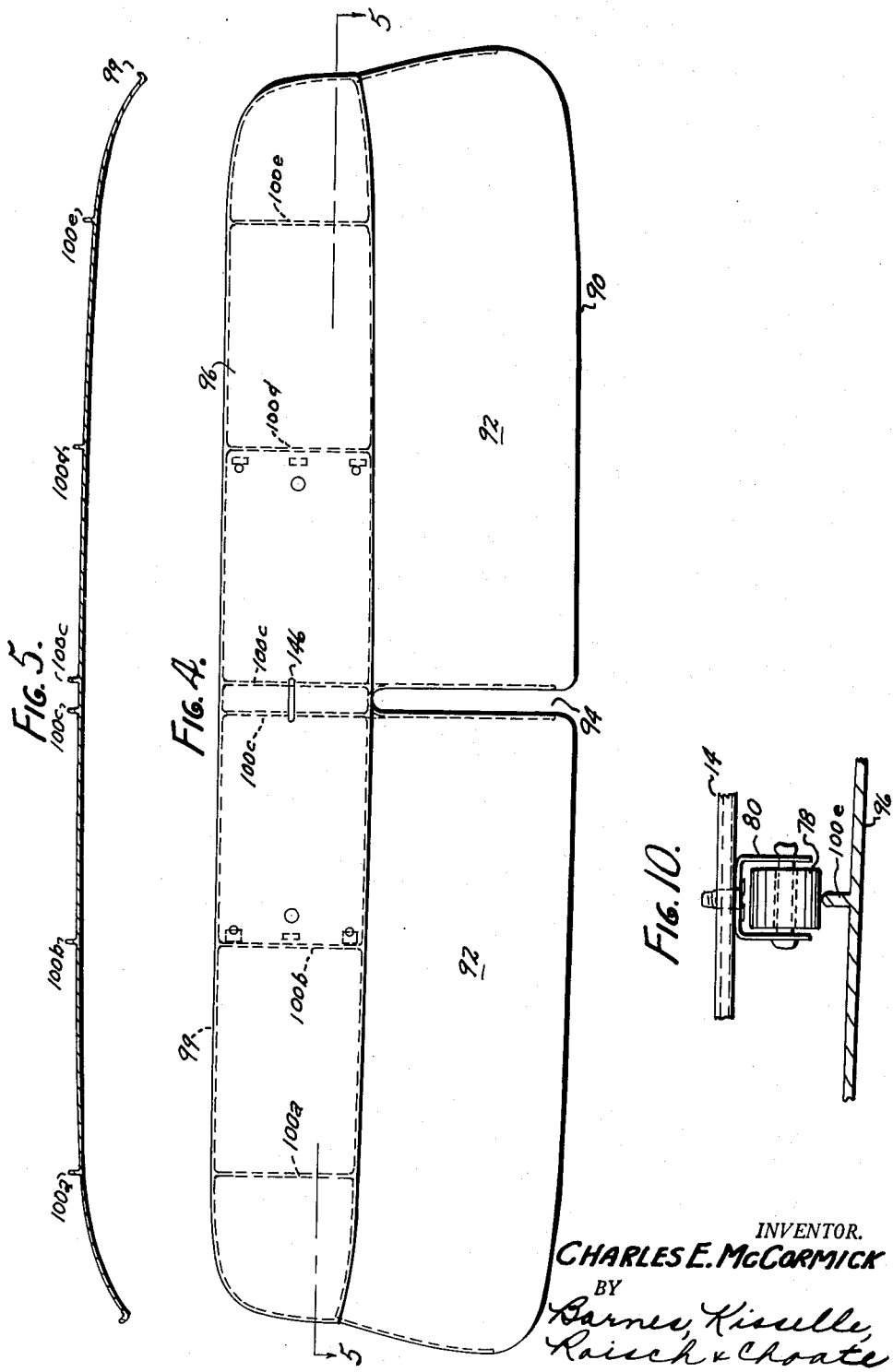
INVENTOR.
CHARLES E. McCORMICK
BY
Barnes, Kisselle,
Raisch & Choate

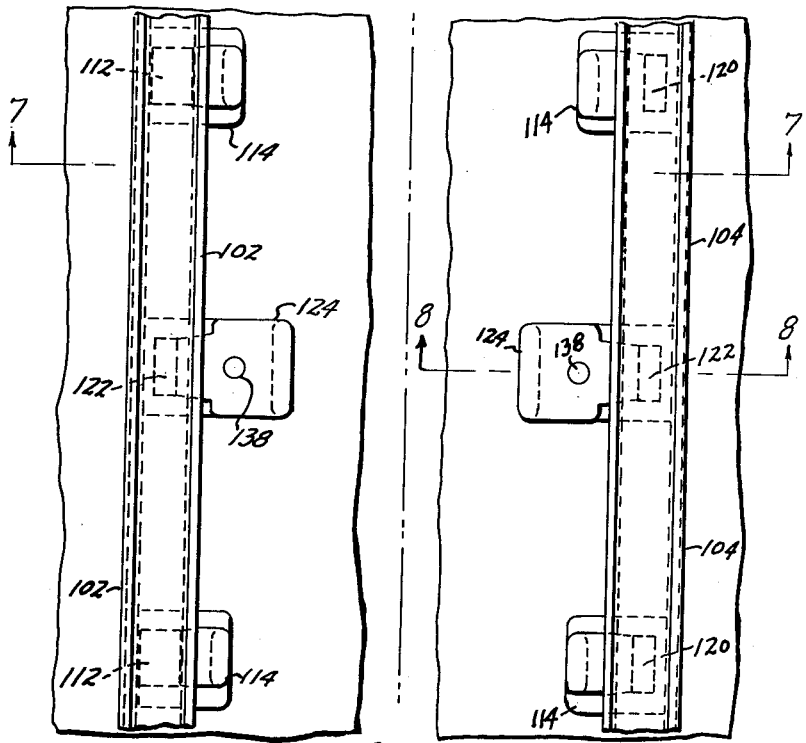
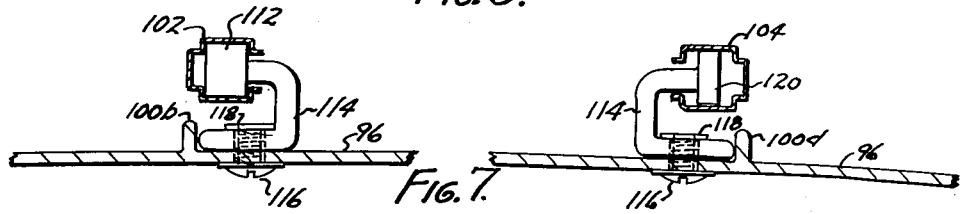
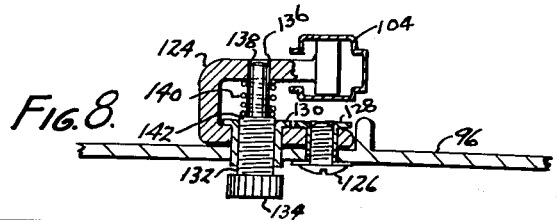
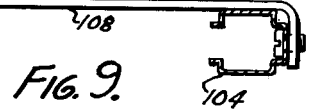

United States Patent Office 3,008,758
Patented Nov. 14, 1961

3,008,758
GLARE SHIELD FOR CURVED WINDSHIELDS
Charles E. McCormick, Detroit, Mich.
(23845 Princeton Ave., Dearborn, Mich.)
Filed Nov. 14, 1958, Ser. No. 778,550
6 Claims. (Cl. 296—97)

This invention relates generally to glare shields and more specifically to adjustable, transparent glare shields for automobiles for protecting the eyes of the driver and passengers from strong sunlight or from the bright headlights of an oncoming car while permitting ample visibility for safe driving.

Heretofore, various types of transparent glare shields or sun visors have been made for protecting the eyes of the driver and passengers of an automobile from strong sunlight and the like. For example, it is sometimes the practice to tint the fixed windshield glass in its entirety. This solution is not entirely desirable because at certain times of the day, under poor light conditions, a diminution of light transmission through the windshield reduces the visual acuity of the driver to the point of poor visibility which is conducive to accidents. Experience has shown that in the case of a glare shield in the form of a transparent tinted panel, the panel should be capable of being readily adjustable by the driver while driving so that with poor light conditions, the glare shield may be entirely or partly removed from the windshield area and with strong or harsh light conditions, the glare shield may be easily adjusted to overlie a small or a large portion of the windshield area.

Glare shields of the conventional type, either opaque or transparent, are usually deficient in that they fail to shut out the strong sunlight entirely across the upper area of the windshield. Such visors or glare shields are usually provided in pairs, one at each side of the automobile. Since the rear view mirror is usually mounted in a position depending from the header across the upper edge of the windshield, such visors or glare shields terminate short of the vertical central line of the windshield to provide clearance for the rear view mirror. The shortcomings of conventional visors are even more apparent in the case of the newer type of windshields where the windshield glass is extended further around the ends to vertically disposed door pillars.

I am well aware of the fact that attempts have been made heretofore to satisfactorily solve this problem by providing tinted, transparent panels arranged to slide into and out of the windshield area; but such arrangements have usually been cumbersome, expensive and not easily interchangeable between cars of different makes and models.

It is an object of this invention to provide a glare shield construction wherein a tinted panel is arranged to be easily adjusted by the driver from an extreme lowered position where it shields substantially all of the upper half portion of the windshield to an extreme raised position where it is substantially entirely removed from the windshield area.

A further object of the invention resides in the provision of an adjustable glare shield of simple and economical construction which with minor alterations can be applied to cars of different makes and models.

A further object of this invention is to provide a simple and economical means for adjustably positioning a glare shield of relatively large area along an arcuate path in a manner such that in any position along the arcuate path, the glare shield will be solidly supported and free from excessive vibration.

In the drawings:
FIG. 1 is an interior view of an automobile looking forwardly and showing a glare shield construction in accordance with the present invention.

FIG. 2 is a fragmentary sectional view taken along the line 2—2 in FIG. 1.

FIG. 3 is a fragmentary sectional view taken along the line 3—3 in FIG. 1.

FIG. 4 is a view of the inner side of the glare shield of modified form in the direction of arrow 4 in FIG. 2.

FIG. 5 is a sectional view taken along the line 5—5 in FIG. 4.

FIG. 6 is a fragmentary plan view of the glare shield with parts broken away and illustrating generally the manner in which the glare shield is supported by the track structure.

FIG. 7 is a sectional view taken along the line 7—7 in FIG. 6.

FIG. 8 is a sectional view taken along the line 8—8 in FIG. 6.

FIG. 9 is a sectional view taken along the line 9—9 in FIG. 2.

FIG. 10 is a sectional view taken along the line 10—10 in FIG. 3.

Referring to the drawings, there is shown an automobile body 10 having a roof panel 12 terminating at its forward edge in a windshield header 14 which defines the upper edge of an opening for a windshield glass 16. Within the automobile, the roof panel 12 is overlaid with a headlining 18. At each side of the body 10, there is provided a front pillar 20 for a door 22 provided with a glass panel 23. The windshield glass 16 extends across the front of the automobile and around each side to the pillar 20.

In the glare shield construction illustrated, the glare shield panel, generally designated 90, is preferably injection molded as a single piece having two perfectly transparent portions 92 divided by a slot 94 and an upper opaque portion 96 (FIG. 4). The slot 94 is provided to accommodate the rear view mirror bracket 98 when the glare shield is in the lowered operative position illustrated in FIG. 1. The necessity for the slot 94 requires that all of the transverse structural strength of the glare shield be designed into the upper opaque portion 96. The opaque portion 96 is therefore embossed and ribbed for stiffness. The ribbing comprises a peripheral rib 99 connected by a plurality of transverse ribs 100. The ribs 99, 100 are formed on the back surface of the glare shield where they are invisible to the occupants of the car.

The glare shield panel 90 is supported for sliding movement between the operative and the inoperative positions by a pair of tracks 102, 104 which are mounted on the header 14 by means of screws 106. The tracks 102, 104 and the glare shield panel 90 are curved to correspond generally with the curvature of the windshield 16 and roof 12. Tracks 102 and 104 are secured to the header 14 in spaced apart relation to correspond generally with the transverse ribs 100b and 100d. These two ribs are spaced inwardly from the opposite ends of the glare shield a distance corresponding generally to about one-third the total width of the glare shield. Tie bars 108 and 110 extend between and are connected at their opposite ends to the rear portions of tracks 102 and 104 to stabilize and maintain parallelism between the two track structures.

Each of the tracks 102 and 104 is generally channel shaped in cross section with the open face thereof vertically disposed and facing the other track. The glare shield panel 90 is slidably supported by the tracks 102, 104 with a plurality of shoes mounted on the back side of the panel and slidably arranged within the tracks. There are three shoes engaged with each of the tracks. The particular arrangement of the shoes in the tracks is illustrated clearly in FIGS. 6, 7 and 8.

Within the track 102, there is arranged a pair of shoes

112. Shoes 112 are mounted on the back side of the glare shield panel 90 by means of U-shaped brackets 114 that are secured to the panel adjacent the rib 100b by means of screws 116 engaged with tubular nuts 118. Shoes 112 are spaced longitudinally within track 102 and are engaged with the track so that they are guided by the track along a linear path coinciding with the center line of track 102. A second pair of shoes 120 is mounted on the back side of panel 90 adjacent the rib 100d by brackets 114 and screws 116 and nuts 118. The shoes 120 are engaged within track 104 but it will be observed that these shoes are considerably narrower than the width of track 104 so that the track 104 merely serves to guide the shoes 120 in an arcuate path lying in a cylindrical surface which is parallel to the center line of track 104. In other words, track 104 guides shoes 120 in a generally vertical direction, while allowing these shoes to wander or float from side to side in a horizontal direction.

In assembling the two tracks to the windshield header, it is difficult to obtain exactly parallel relationship between the two tracks; and the maintenance of parallel relationship between the two tracks in use is also difficult. It will also be appreciated that there is a wide variance between the heat coefficience of expansion of the plastic from which the glare shield is made and the steel body structure on which the two tracks are mounted. Thus, by employing the two shoes 112 in track 102, which are accurately guided by the track 102 to follow a path of travel coinciding with the center line of track 102, and by providing the shoes 120 in the track 104, which are free to shift transversely of track 104, the center spacing of the two tracks may vary within certain limits while allowing the free movement of the glare shield along an arcuate path which coincides with the center line of track 102.

The shoes 112 and 120 are preferably formed of a tough plastic material such as nylon, and the brackets 114 are also preferably formed of this material. The exact shape of shoes 112 and 120 is not important. In the arrangement illustrated, these shoes are in the form of a rectangular six sided prism. It is important, however, that the shoes 112 substantially fill the inner cross section of the track or otherwise engage the track 102 so that these shoes are guided along a linear path which coincides exactly with the center line of track 102. The second pair of shoes 120 fill the inner cross section of track 104 from top to bottom but must be sufficiently narrower than the inner cross section of track 104 to provide ample side clearance between the shoes 120 and track 104.

With this arrangement, there will be no binding or cocking of the glare shield as it is shifted to and from the operative position along the two tracks.

There is also mounted on the rear side of glare shield 90, a third shoe 122 for each of the two tracks. The third shoe 122 in each track is mounted on the glare shield midway between the other two shoes by means of a U-shaped plastic bracket 124 which is secured to the rear face of the glare shield by means of screws 126 and tubular nuts 128. Within the base of each of the brackets 124, there is arranged another tubular nut 130 through which a thumb screw 132 is threaded. The headed end 134 of thumb screw 132 is disposed on the front or underside of glare shield 90, and the opposite end of thumb screw 132 is reduced as at 136 and extends through an opening 138 in the leg of bracket 124 opposite the base portion thereof. A coiled compression spring 140 is arranged around the reduced portion 136 of thumb screw 132. One end of spring 140 bears against the shoulder 142 of thumb screw 132 and the opposite end of spring 140 bears against the arm of bracket 124 that is provided with the opening 138.

By advancing thumb screw 132 through the tubular nut 130, spring 140 is compressed and the shoe 122 is biased from a normal position in alignment with the other two shoes in the track against the top surface of the track. This results in an equal and opposite pressure by the two end shoes against the bottom surface of the track. In this manner, additional friction is set up between the shoes and each track to hold the glare shield against unwanted movement while permitting it to be adjusted to different positions with a minimum of effort.

While the glare shield 90 is well supported in all of its adjustable positions by the two spaced tracks 102 and 104, it has been found desirable to include in the arrangement a pair of rollers 78 carried by brackets 80 fixed on the header structure at the upper edge of the windshield opening adjacent each end thereof for exerting pressure downwardly from the body structure of the automobile against the outer ends of the glare shield at points on opposite sides of the tracks 102, 104. The bearing stands 80 are fixed to the header 14 so that the rollers 78 will coincide in position with the travel of ribs 100a and 100e. Thus, the rollers 78 at all times exert a downward pressure on the opposite end portions of the glare shield 90 to impart stability to the glare shield and prevent excessive vibration thereof near the ends.

In FIGS. 1 and 2, the glare shield is shown in its operative position. In this position, the glare shield overlies substantially the upper two-thirds or three-quarters of the windshield. The lowermost position of the glare shield is limited by stops 144 secured to the lower ends of channel tracks 102, 104. To shift the glare shield to its inoperative position, it is merely grasped by the depending lug 146 on the front side of the glare shield (FIG. 4) and pushed upwardly and rearwardly to a position wherein the shoes adjacent the upper or the rear edge of the glare shield engage with stops 148 secured to the rear or upper ends of the channel tracks 102, 104.

As the glare shield is shifted to and from the operative position, the rollers 78 exert a downward pressure against the back face of the glare shield near the opposite ends thereof. In the inoperative position, rollers 78 bear against the back side of the transparent panel portions 92 and in the operative position, these rollers bear against the ribs 100a, 100e of the opaque portion 96 of the glare shield. In either position, the downward pressure of the rollers 78 against the ends of the glare shield imparts stability to the relatively large panel and prevents excessive vibration thereof.

The ease with which the glare shield can be shifted to and from the operative position is controlled by adjusting the thumb screws 132. Preferably, these screws are so adjusted that the friction is only sufficient to hold the glare shield in a position partly overlying the windshield 16. In use, if the glare shield tends to creep downwardly from any position to which it is adjusted, this can be prevented by simply tightening thumb screws 132 slightly.

Thus, it will be seen that I have provided a glare shield arrangement for an automobile which is of relatively simple construction but which, at the same time, is quite rigid, stable and easily adjusted to the various positions required. It is readily adaptable to various models of automobiles; and although it is designed to cover substantially the entire windshield, the track arrangement which guides its movement from a position slightly below and generally parallel to the headlining of the automobile in the inoperative position and generally parallel to the windshield in the operative position results in an arrangement which does not detract from the interior or exterior appearance of the automobile. Furthermore, extremely simple friction means are provided for guiding the movement of the glare shield in the track arrangement and for normally maintaining the glare shield in a desired position of adjustment. The unique slider construction illustrated provides a maximum support for the relatively large glare shield and, at the same time, eliminates all problems of misalignment of the two tracks or the difference in expansion of the various components.

I claim:
1. In combination with a vehicle having a roof structure and a windshield extending downwardly and forwardly from the front edge of the roof structure, a pair of channel shaped tracks mounted on the underside of said roof structure within the vehicle and extending longitudinally of the vehicle in generally parallel relation to said roof structure and along lines spaced inwardly from the opposite side edges of the windshield, said tracks being spaced equally from the longitudinal center line of the vehicle and terminating at their forward ends adjacent the upper edge of the windshield, a glare shield panel having a width generally corresponding to the width of the windshield and means for supporting the glare shield panel for sliding movement along said tracks to an operative position generally overlying the windshield and to an inoperative position generally underlying said roof structure, said supporting means comprising two pairs of sliders mounted on the back side of said glare shield panel inwardly of the side edges of the panel, one pair engaged within each track and thereby supporting one end of the glare shield panel, the forwardmost slider of each pair being positioned a distance rearwardly of the front edge of the glare shield panel, the sliders in each pair being mounted on said panel so as to be spaced apart longitudinally within the tracks, one said track having transversely opposed portions, the sliders in one pair closely engaging said transversely opposed portions of their respective track and being held thereby in a transversely fixed position independently of the other track and sliders, the other pair of sliders engaging their respective track for relatively substantial movement transversely thereof whereby to prevent binding of the sliders in said tracks and at the same time control the movement of the glare shield panel to an accurately defined path.

2. The combination called for in claim 1 wherein said tracks are arcuately shaped in vertical longitudinal section and said glare shield panel is similarly shaped in cross section.

3. The combination called for in claim 1 including a third slider in each track, each of said third sliders being fixedly mounted on said glare shield panel generally in alignment with and medially between the sliders in each pair, and means for biasing said third slider in each track vertically relative to the other two sliders in each track whereby to control the degree of frictional engagement of the sliders with the tracks.

4. The combination called for in claim 1 wherein said first mentioned pair of sliders are shaped to substantially fill the cross sectional area of their respective track and the second mentioned pair of sliders are dimensioned narrower than their respective track.

5. In combination with a vehicle having a roof structure and a windshield extending downwardly and forwardly from the front edge of the roof structure, a pair of channel shaped tracks mounted on the underside of said roof structure within the vehicle and extending longitudinally of the vehicle in generally parallel relation to said roof structure along lines spaced inwardly from the opposite side edges of the windshield, said tracks being spaced equally from the longitudinal center line of the vehicle and terminating at their forward ends adjacent the upper edge of the windshield, said tracks having the slotted faces thereof disposed generally vertically and transversely juxtaposed, a glare shield panel having a width generally corresponding to the width of the windshield and means for supporting said glare shield panel for sliding movement along said tracks to an operative position generally overlying the windshield and to an inoperative position generally underlying said roof structure, said supporting means comprising two pairs of sliders fixedly mounted on the back side of said panel, one pair engaged with each track, the forwardmost slider of each pair being positioned a distance rearwardly of the front edge of the glade shield panel, each of said sliders comprising a shoe member engageable within the tracks and a supporting arm connected to said panel and having a horizontally extending portion extending through the slotted face of the two tracks, the sliders in each pair being mounted on said panel so as to be spaced apart longitudinally within the tracks, the sliders in one pair closely engaging transversely opposed portions of their respective track and being held thereby in a transversely fixed position independently of the other track and sliders, the other pair of sliders engaging their respective track for relatively substantial movement transversely thereof whereby to prevent binding of the sliders in said tracks and at the same time control the movement of the glare shield panel to an accurately defined path.

6. The combination called for in claim 5 including a third slider for each track, said third sliders being fixedly mounted on the panel by means of a support arm connected to said panel and said third slider and having a generally horizontally extending portion extending through the slotted faces of the two tracks, the third sliders being located between and in alignment with the two sliders in each mentioned pair of sliders and means for adjustably biasing the horizontally extending support arm portions associated with said third sliders for controlling the degree of frictional engagement between the sliders and the tracks.

References Cited in the file of this patent
UNITED STATES PATENTS

| | | |
|---|---|---|
| 1,718,183 | Smith | June 18, 1929 |
| 1,864,943 | Riddle | June 28, 1932 |
| 1,872,553 | Ayers | Aug. 16, 1932 |
| 1,917,799 | King et al. | July 11, 1933 |
| 1,989,592 | Ghazal | Jan. 29, 1935 |
| 2,102,454 | Bennett | Dec. 14, 1937 |
| 2,160,505 | Jacobs | May 30, 1939 |
| 2,252,715 | Levy | Aug. 19, 1941 |
| 2,703,726 | Breeze | Mar. 8, 1955 |
| 2,862,762 | McCormick | Dec. 2, 1958 |